United States Patent
Sutherland (10) Patent No.: US 7,900,367 B2
(45) Date of Patent: Mar. 8, 2011

(54) DIFFERENTIAL CALIBRATION (75) Inventor: Alexander Tennant Sutherland, Edinburgh (GB)

(73) Assignee: Renishaw PLC, Wotton-Under-Edge (GB)

( * ) Notice: Subject to any disclaimer, the term of this patent is extended or adjusted under 35 U.S.C. 154(b) by 89 days.

(21) Appl. No.: 12/225,822

(22) PCT Filed: Apr. 24, 2007

(86) PCT No.: PCT/GB2007/001496
§ 371 (c)(1),
(2), (4) Date: Sep. 30, 2008

(87) PCT Pub. No.: WO2007/125306
PCT Pub. Date: Nov. 8, 2007

(65) Prior Publication Data
US 2009/0307915 A1  Dec. 17, 2009

(30) Foreign Application Priority Data
Apr. 26, 2006  (GB) .................................. 0608235.8

(51) Int. Cl.
*G01B 1/00*  (2006.01)
*G01B 5/004*  (2006.01)
*G01B 21/04*  (2006.01)

(52) U.S. Cl. ................. 33/502; 33/503; 33/556; 702/95

(58) Field of Classification Search ............ 33/502–504, 33/556, 558, 559, 561; 702/94, 95, 150, 702/168; 73/1.79
See application file for complete search history.

(56) References Cited

U.S. PATENT DOCUMENTS

| | | | |
|---|---|---|---|
| 5,610,846 A * | 3/1997 | Trapet et al. | 702/95 |
| 5,649,368 A | 7/1997 | Herzog et al. | |
| 5,806,201 A * | 9/1998 | Feichtinger | 33/561 |
| 6,580,964 B2 | 6/2003 | Sutherland et al. | |
| 6,601,311 B2 * | 8/2003 | McMurtry et al. | 33/502 |
| 6,810,597 B2 * | 11/2004 | Grzesiak et al. | 33/503 |
| 6,909,983 B2 | 6/2005 | Sutherland | |
| 7,055,367 B2 * | 6/2006 | Hajdukiewicz et al. | 73/1.79 |
| 7,254,506 B2 * | 8/2007 | McMurtry et al. | 702/95 |
| 7,526,873 B2 * | 5/2009 | Jonas et al. | 33/561 |
| 2004/0244464 A1 * | 12/2004 | Hajdukiewicz et al. | 73/1.79 |

FOREIGN PATENT DOCUMENTS

| | | |
|---|---|---|
| EP | 0 508 686 A2 | 10/1992 |
| WO | WO 00/25087 A1 | 5/2000 |
| WO | WO 03/074968 A1 | 9/2003 |
| WO | WO 2004/005849 A1 | 1/2004 |
| WO | WO 2005/059471 A1 | 6/2005 |

* cited by examiner

*Primary Examiner* — Amy Cohen Johnson
(74) *Attorney, Agent, or Firm* — Oliff & Berridge, PLC (57) ABSTRACT

A method of calibrating a measurement probe (10) mounted on a machine is described. The measurement probe (10) has a stylus (14) with a workpiece contacting tip (16). The method comprises determining a probe calibration matrix that relates the probe outputs (a,b,c) to the machine coordinate system (x,y,z.). The method comprising the steps of scanning a calibration artefact (18) using a first probe deflection ($d_1$) to obtain first machine data and using a second probe deflection ($d_2$) to obtain second machine data. The first and second machine data are used to obtain a pure probe calibration matrix in which any machine errors are substantially omitted. Advantageously, the method determines the pure probe matrix numerically based on the assumption that the difference between the first and second machine position data is known.

15 Claims, 4 Drawing Sheets

DIFFERENTIAL CALIBRATION

The present invention relates to a method of calibrating a measurement probe mounted on a machine, and in particular to a method of determining a probe calibration matrix.

In a measuring system, for example a machine tool and measurement probe, there are a number of factors which affect the accuracy of any readings taken. These factors include errors such as machine errors which include straightness and squareness errors; dynamic errors; and errors from the conversion of probe readings into machine axis readings. In order to mitigate these effects, a machine and measurement probe are calibrated prior to any measurements being taken.

Various techniques have been developed to calibrate such measurement apparatus. These include carrying out scans at different locations within the working envelope of the machine to create an error map for the machine. It is also known to scan a standard workpiece using different probe deflections in order to create a map function of error related to deflection. This error map is subsequently used when measuring real workpieces to check for tolerance.

Another technique is to use a calibration artefact (often a sphere) to create a probe calibration matrix for relating probe (a,b,c) axis readings to machine (x,y,z) axis readings. A problem is that there are also other contributing factors that are incorporated into the probe calibration matrix. These can be grouped into global machine errors, local machine errors and dynamic errors. Standard probe calibration processes group all these factors into a single probe calibration matrix which only provides accurate conversion of probe axis readings into machine coordinates for measurements taken in the same region of the machine, and at the same speed, as those used in the calibration process.

Generally, the calibration and measuring processes are carried out at the same speed so that dynamic errors, for example, from acceleration are mitigated. However, when there are sudden changes in the profile of a workpiece or small features to be scanned, the speed at which the whole measuring process can be carried out is then limited.

According to a first aspect of the invention, a method of calibrating a measurement probe mounted on a machine is provided, the measurement probe having a stylus with a workpiece contacting tip, wherein the method comprises determining a probe calibration matrix that relates the probe outputs to the machine coordinate system, the method comprising the steps of:
  (i) scanning a calibration artefact using a first probe deflection to obtain first machine data;
  (ii) scanning the calibration artefact using a second probe deflection to obtain second machine data; and
  (iii) using the first machine data and the second machine data to obtain a pure probe calibration matrix in which any machine errors are substantially omitted.

The present invention thus provides a measurement probe calibration technique in which two scans of a calibration artefact (e.g. a sphere) are performed by the measurement probe using first and second probe deflections. This provide first machine data and second machine data from which a pure probe calibration matrix can be determined in which machine errors are substantially removed or omitted. The pure probe calibration matrix determined using this method thus allows probe outputs in the probe co-ordinate system to be converted into machine axes components; i.e. the relevant machine axis components of probe deflection can be obtained by multiplying each probe output component by the relevant matrix terms. As outlined below, once the pure calibration matrix is known it is then possible to establish calibration matrices to correct machine geometry and dynamic errors.

The method of the present invention provides a pure probe calibration matrix that is substantially unaffected by any machine errors that are present whilst scanning the calibration artefact. In contrast, prior art techniques provide a probe calibration matrix that includes machine errors which arise from a combination of global machine errors and local machine errors. The prior art calibration techniques thus provide a probe calibration matrix that is only valid within the proximity of the region of the machine in which the measurement data was acquired and the probe calibration matrix must therefore be recalculated for each further region in which a workpiece is to be measured. By determining a pure probe matrix, the present invention thus reduces the time required to calibrate a machine and allows measurement probe outputs (e.g. sets of a, b, c values) to be accurately converted into the machine co-ordinate system at any location within the working envelope of the machine tool. As outlined in more detail below, establishing a pure probe calibration matrix in accordance with the present invention also allows dynamic errors to be quantified thereby facilitating variable speed scanning.

Advantageously, the probe outputs comprise probe output data defined in a probe co-ordinate system. Step (i) may thus also comprise obtaining first probe output data corresponding to said first machine data. Also, step (ii) may comprise obtaining second probe output data corresponding to said second machine data. In such a case, step (iii) may conveniently comprise using the first machine data, the second machine data, the first probe output data and the second probe output data to obtain the pure probe calibration matrix. In other words, corresponding pairs of machine data (e.g. x,y,z values) and probe output data (e.g. a,b,c values) may be acquired at multiple points on the surface of the calibration artefact for each of the two different probe deflections.

Advantageously, step (iii) comprises using a numerical process to establish the pure probe calibration matrix. For example, a geometrical relationship may be established to allow a certain value or dimension to be calculated (assuming a certain pure probe calibration matrix) from the sets of probe output data and corresponding machine data that are acquired at each of the two probe deflections. The value resulting from the calculation may then be compared to a known (e.g. pre-measured) value. In particular, a numerical process may conveniently be performed in which the terms of the pure probe calibration matrix are iteratively varied to minimise the difference or error between such calculated values and the known value.

In step (i) of the method, the machine scans the measurement probe along a first tool path. This tool path is selected so that the stylus tip contacts the calibration artefact to give the above mentioned first probe deflection. If the calibration artefact is a sphere, the first tool path will thus comprise (taking a two dimensional example for simplicity) a circle of radius $M_1$ approximately centred on the sphere centre. During step (ii) of the method, the machine will scan the measurement probe along a second tool path. In order to obtain the required second stylus deflection, the second tool path comprises a circle of radius $M_2$ that is also approximately centred on the sphere centre. The difference between the first and second tool paths (the radial difference $M_2-M_1$ in this example) can thus be assumed to be known; i.e. the machine will have been instructed to scan the probe along two tool paths having a certain known difference in radius. This assumption has been found to be valid because the local and global machine errors for the machine positions when carrying out the two scans are the same, or any difference is negligible. A machine position difference value (e.g. $M_2-M_1$) related to the difference between the first machine data and the second machine data can thus conveniently be assumed to be known.

As outlined in more detail below, an expression can also be derived from which the machine position difference value (e.g. $M_2-M_1$) can also be calculated (for a given pure probe calibration matrix) from first and second sets of probe outputs and machine data that are acquired from the scans performed at the first and second probe deflections. The calculated machine position difference value for each set of acquired data can then be compared to the known value.

Advantageously, an error value may thus be found that quantifies the difference between the known and calculated machine position difference values. An error minimisation technique (e.g. a least sum of squares method) may then be performed in which the values of the pure probe calibration matrix are iteratively varied to minimise the error. Step (iii) of the above described method may thus conveniently comprise the step of minimising the error between known and calculated machine position difference values.

Advantageously, the first machine data comprises a series of first machine data values and the second machine data comprises a series of second machine data values. The first machine data values and the second machine data values preferably relate to machine positions that have corresponding surface normal vectors. Taking the above described example, the first and second machine data values may thus be arranged to relate to machine positions of the same angle. The machine may be arranged such that machine position data is initially acquired at the same angular positions during the two different probe deflection scans. Alternatively, the first or second machine position data may be interpolated. The first or second, probe output data may also be interpolated in a similar manner.

Once a pure probe calibration matrix has been established using the above described method, it is possible to calculate so-called ball bar data; this is described in more detail below. The method thus advantageously includes the step of (iv) taking machine data and corresponding measurement probe outputs that are acquired from the calibration artefact when located at a first position within the machine envelope. Step (iv) may involve taking machine data and corresponding probe outputs acquired during step (i) or step (ii) of the above described method or it may involve collecting further data. The first position may or may not correspond to the position of the calibration artefact during steps (i) and (ii). A further step (v) can then be performed in which the pure probe calibration matrix as determined in step (iii) is used to provide ball bar data that allows the instructed machine movement to be compared to actual machine movement. In other words, knowing the pure probe calibration matrix allows a ball bar plot to be produced (without actually using a ball bar) from data acquired when scanning the calibration artefact.

Advantageously, step (v) comprises calculating a machine geometry calibration matrix for said first position within the machine envelope. Such a machine geometry calibration matrix allows geometric errors associated with the machine to be removed from the resulting stylus tip position data.

As the machine geometry errors are a combination of global errors and local errors and how they interact, the machine geometry calibration matrix will only remove machine errors for the region of the working envelope of the machine in which the calibration was carried out. If measurements are needed outside of this region, then the calibration method can be carried out at different locations in the working envelope, perhaps to produce a machine error independent error map of that machine for the measurement conditions used. If required, step (iv) can thus be repeated with the calibration artefact placed in one or more different positions within the machine envelope. In this manner, geometry calibration matrices can be found for a plurality of different positions within the machine envelope.

In addition to, or instead of, establishing machine (geometry) errors it is also possible to use the pure probe calibration matrix determined in accordance with the present invention in a method for correcting dynamic errors. This is achieved by performing at least two scans at different speeds using the same stylus deflection. The method may thus conveniently comprise the step of scanning the calibration artefact at two or more different speeds. Conveniently, a dynamic calibration matrix is determined from the machine data and probe outputs acquired from the scans performed at the different speeds. The easiest way to do this is to carry out a further calibration scan using one of the deflections used previously (e.g. during step (i) or step (ii)) at a different speed. Advantageously, step (i) is thus performed at a first scan speed and then repeated at a second scan speed. In this manner, only one additional scan (i.e. at a second speed) is necessary to also establish a dynamic calibration matrix.

In its simplest form, a dynamic calibration matrix allows machine position data collected at a first scan speed to be mapped to machine position data collected at a second scan speed. In order to enable a variable speed scan to be performed, the dynamic errors due to the change in velocity of the probe must be established or interpolated for each speed at which measurements are to be taken. The calibration artefact may thus be scanned at multiple (e.g. three or more, four or more, five or more) speeds to allow subsequent measurements to be taken at variable speeds. The number of speeds at which the calibration artefact is scanned will thus depend on the required accuracy of the dynamic correction and the range of speeds that are likely to be used in the measurement scanning process. It is also preferred that a number of scans are performed at each deflection, each at a different speed within the range that will be used; this improves the accuracy of the interpolation process.

In common with the geometric calibration matrix, the dynamic calibration matrix will vary with the position of the calibration artefact within the machine envelope. A number of dynamic calibration matrices may thus be determined if required. A combined geometric and dynamic calibration matrix could also be established for one or more positions within the working envelope.

It should be noted that prior art techniques do not allow the separation of probe, machine geometry and dynamic error compensation matrices. In known calibration processes, it is thus not possible to conduct scans at variable speed as the influence of machine errors on dynamic errors is not linear or predicable. In contrast, the present invention allows each of these errors to be established separately thereby enhancing measurement accuracy.

The matrices described above (e.g. the pure probe calibration matrix, the geometric calibration matrix and the dynamic calibration matrix) may be advantageously implemented in any suitable form. For example, such a matrix may take the form of an array of functions or may comprise one or more look up tables (LUTs). Conveniently, one or more of the matrices may be multi-dimensional.

Advantageously, the scanning axes of the measurement probe are mutually orthogonal (i.e. the probe may use a Cartesian co-ordinate system). Similarly, the machine may use a Cartesian co-ordinate system. Conveniently, the axes of the probe co-ordinate system are nominally parallel to the axes of the machine coordinate system. Although a Cartesian geometry is described herein, the invention could be applied using any type of machine and/or probe geometry. For example, the measurement probe could output polar co-ordinate data that is converted to a Cartesian machine co-ordinate system. Although the method can be implemented to provide mapping between probe and machine axes in three dimensions, it should also be noted that the technique is equally applicable for two dimensional applications.

Advantageously, steps (i) and (ii) comprise scanning the stylus tip of the measurement probe along substantially the same path across the surface of the calibration artefact. Conveniently, steps (i) and (ii) each comprise scanning the surface of the calibration artefact in one or more planes. For example, a multi-plane scanning technique of the type described below with reference to FIG. 2 could be used. It should, however, be noted that any scan path could be used.

Although the method is described as comprising two scans performed at a first and second probe deflection, it should be noted that one or more further scans at different probe deflections could additionally be performed. For example, the method may also comprise the step(s) of scanning the calibration artefact using third, fourth, fifth etc probe deflection to obtain third, fourth, fifth etc machine data.

Although any shape of calibration artefact could be used, the calibration artefact advantageously comprises a sphere. It should also be noted that the machine employed in the above method may comprise any type of co-ordinate positioning machine. For example, it may comprise a machine tool, co-ordinate measurement machine or similar.

According to a second aspect of the present invention, measurement apparatus comprises a measurement probe, a machine and a calibration artefact, wherein the measurement probe has a stylus with a workpiece contacting tip, the measurement probe is mounted on said machine and said machine comprises a controller for controlling movement of the measurement probe, wherein the controller is arranged to perform a calibration routine to determine a probe calibration matrix that relates the probe outputs to the machine coordinate system, the controller being arranged to: (i) cause the measurement probe to scan a calibration artefact using a first probe deflection thereby obtaining first machine data; (ii) cause the measurement probe to scan a calibration artefact using a second probe deflection thereby obtaining second machine data; and (iii) use the first machine data and the second machine data to obtain a pure probe calibration matrix in which any machine errors are substantially omitted. The controller may further be arranged to implement any steps of the method according to the first aspect of the invention outlined above.

The invention will now be explained by way of example only, with reference to the accompanying drawings, in which.

Figure 1:
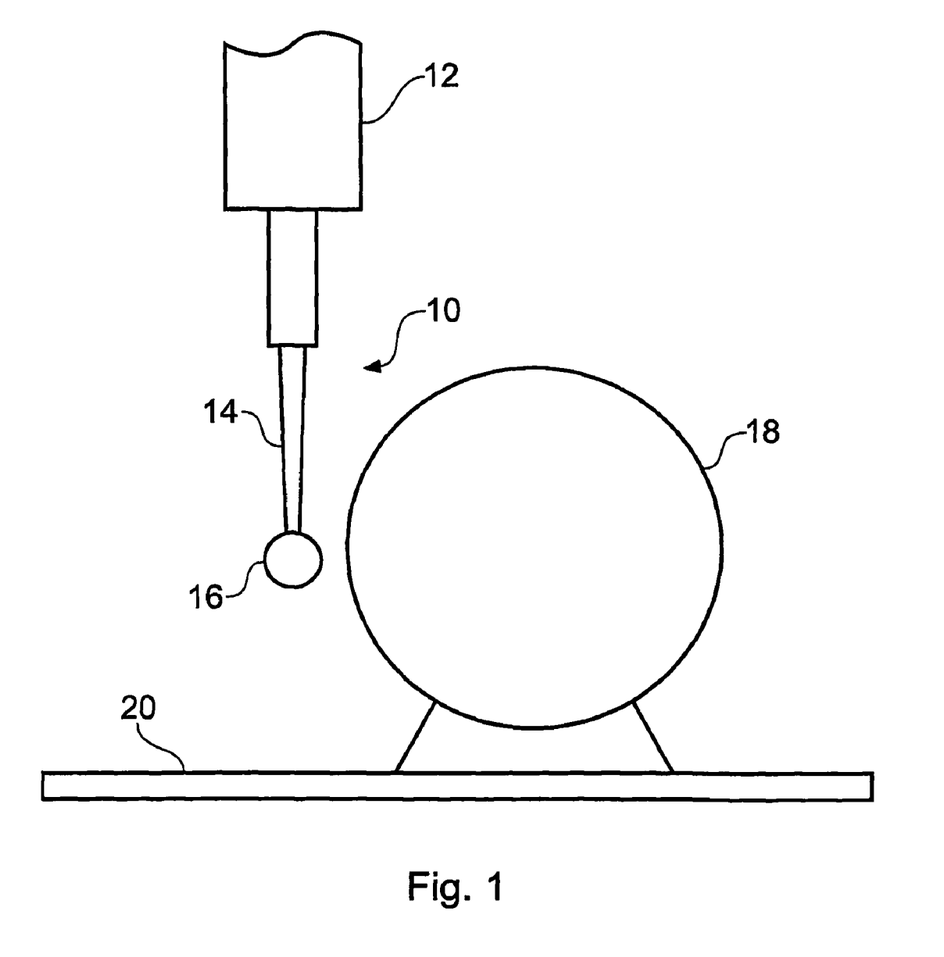
FIG. 1 is a schematic view of a measurement probe.

FIG. 1 shows a probe 10 at one end attached to a machine tool via a quill 12 and at the distal end of the probe is a stylus 14 having a workpiece contacting tip 16. The machine tool includes a bed 20 onto which a workpiece or, in this case a calibrating sphere 18, is located.

The probe 10 is an analogue or scanning probe that generates probe deflection data related to any deflection of the stylus in its three orthogonal (Cartesian) scanning axes. The raw probe outputs of deflection are herein termed a, b, c co-ordinate values. The machine tool also comprises position encoders or the like that measure the position of the quill in the machine co-ordinate (X,Y,Z) geometry; i.e. provide so-called machine data.

In order to provide a measurement of the stylus tip position, it is necessary to convert the measurements taken in the probe (a,b,c) co-ordinate system into the machine (X,Y,Z) co-ordinate system. To provide such a conversion, it is known to derive a so-called probe matrix ($\Delta_{m+p}$) to convert the (a,b,c) probe data into the machine (X,Y,Z) co-ordinate system. This allows the probe and machine data to be combined to provide the position of the tip of the probe (and hence the position of a point on the surface of an object) in machine (X, Y, Z) co-ordinates.

Figure 2:
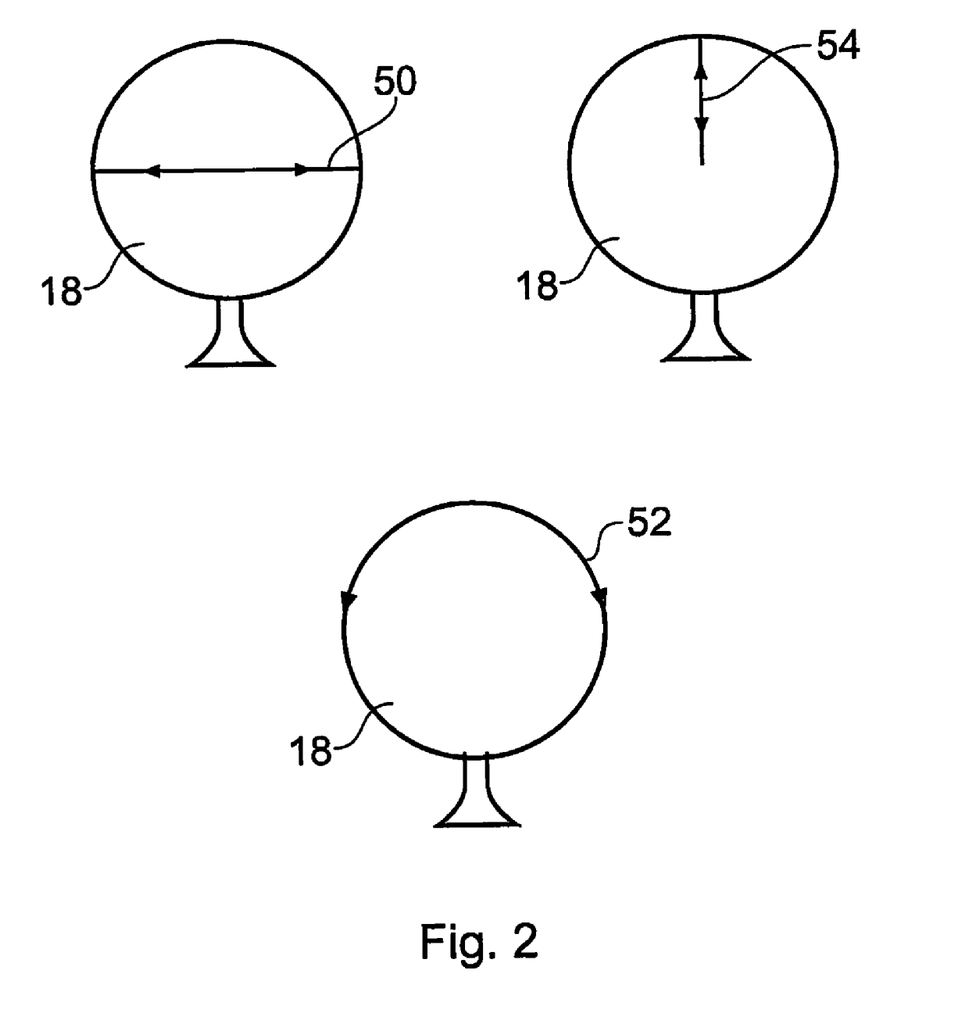
FIG. 2 shows schematically a scan of the calibration process.

A method for deriving such a probe matrix is described in U.S. Pat. No. 6,909,983. The method involves scanning the stylus around a calibration sphere using a single probe deflection (d). In particular, it is described in U.S. Pat. No. 6,909,983 how bi-directional scans may be performed in each plane of the machine coordinate system. This is also illustrated in FIG. 2 where three orthogonal planes 50, 52 and 54 have been chosen which correspond to the x,y; x,z and y,z planes respectively of the machine axes. The machine data and probe deflection data acquired during such scans are then used in an iterative (least sum of squares) process to find an optimised probe matrix. This optimisation process is based on minimising the radial error that is associated with determined positions on the sphere surface.

The calibration process described in U.S. Pat. No. 6,909,983 thus enables tip position to be established using the following matrix equation:

$$\text{Tip position} = \Delta_{p+m} P + M \tag{1}$$

where M is the machine data, P the probe (a,b,c) data and $\Delta_{p+m}$ is the (optimised) probe calibration matrix for converting probe (a,b,c) data into the machine coordinate geometry. It is important to note that this prior art technique generates a probe calibration matrix that includes both probe (p) and machine (m) errors. Repeating the calibration process in a different part of the machine working space (i.e. where the machine errors are different) will thus produce a probe calibration matrix having different values. The probe calibration matrix $\Delta_{p+m}$ may thus need to be found in each location if measurement data is to be acquired with high accuracy.

In accordance with the present invention, an improved calibration technique has been derived that allows a pure probe calibration matrix to be found. In other words, a method has been devised for finding a calibration matrix ($\Delta_p$) that does not include a significant contribution from the machine errors. The method of the present invention involves taking measurement using at least two different stylus deflections and will now be described in more detail.

Figure 3A:
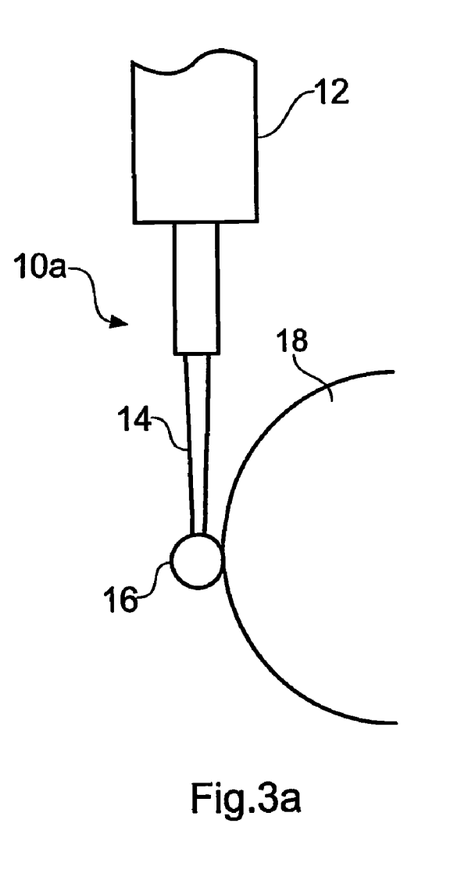
FIG. 3 shows schematically calibration of a probe at different deflections.
Figure 3B:
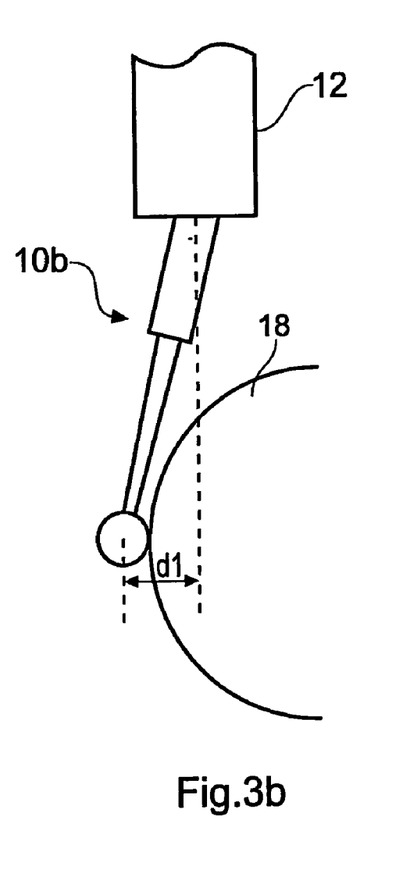
Figure 3C:
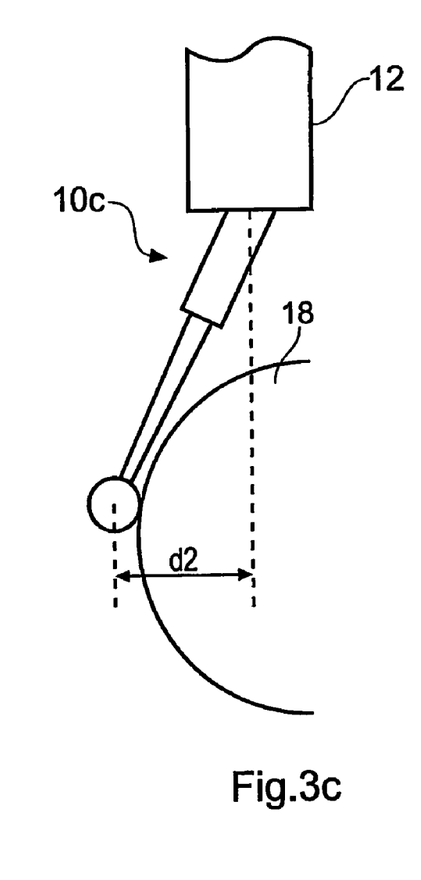

Referring to FIGS. 3a, 3b and 3c a probe 10a, 10b and 10c is shown at zero deflection, deflection $d_1$ and deflection $d_2$ respectively. In all three cases, the probe tip is in contact with a calibrating sphere 18. The steps of the method will now be described in detail.

A first step is performed of establishing the resting position of the probe tip 16. This resting position is denoted as the probe zero position ($P_0$). Such an upfront step of finding the resting position prevents any deflection of the probe tip from a true resting position from being used in subsequent calibration calculations. It should be noted that such an initial step is optional and an arbitrary probe zero position ($P_0$) could be assumed.

A second step is also performed in which the centre of the calibration sphere is found. A minimum of four measurements of points on the sphere surface are required to provide an estimate of the location of the centre of the sphere. A process for finding a sphere, centre is described in more detail in International Patent Application WO00/25087. This second step enables calibration paths to be selected which ensure the probe tip maintains contact with the calibration sphere throughout the calibration process with approximately the required amount of deflection. This step may provide only an estimate of the sphere centre position and the sphere centre may, as described below, also be included as a variable in the subsequent optimisation process. Alternatively, the sphere centre position as found during this step may be fixed (i.e. assumed known) during the subsequent optimisation process.

As shown in FIG. 3b, the measurement probe is scanned around the calibration sphere 18 with an approximately constant stylus deflection $d_1$. For convenience, scans are performed in each plane of the machine coordinate system along the paths shown in FIG. 2 above. It should, however, be noted that it is not essential that the three planes which are scanned are orthogonal. Performing scans of the type shown in FIG. 2 is, however, preferred because they ensure that substantially the same path along the surface of the calibration sphere is traced by the stylus tip irrespective of the amount of probe deflection. During the scan, pairs of machine data (x,y,z) and corresponding probe deflection (a,b,c) data are collected at multiple points around the scan path.

It should be noted that the paths shown in FIG. 2 may be scanned in one direction or a bi-directional scan may be performed. Bi-directional scanning has the advantage of removing direction based effects (e.g. friction, drag etc.) from the pure probe calibration matrix. Alternatively, separate pure probe calibration matrices may be calculated for scans performed in different directions.

As shown in FIG. 3c, the bi-directional scanning process is repeated using a second, approximately constant, stylus deflection $d_2$. During the second scan, pairs of machine data sets (x,y,z) and corresponding probe deflection data sets (a,b,c) are again collected at multiple points around the scan path. An example of suitable deflections for the first and second scans are 50 μm and 500 μm. Both scans may be carried out at a speed of, say, 250 mm/s.

Referring to FIG. 4, it will be described how the data acquired for the two different deflections ($d_1$ and $d_2$) described with reference to FIG. 3 above can be used to calculate a pure probe calibration matrix.

Figure 4A:
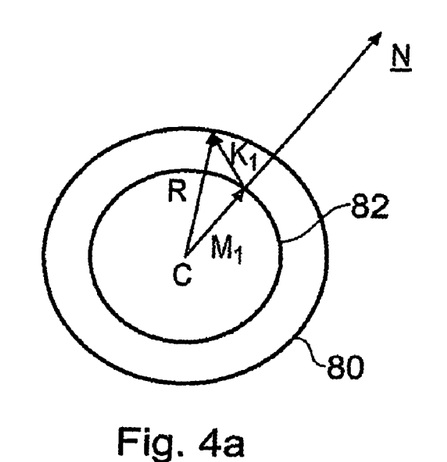
FIG. 4 shows the geometry of the measurement system.

The geometry of the first scan (i.e. the scan with stylus deflection $d_1$) is shown in FIG. 4a. It can be seen that the surface of the calibration sphere in the X-Y plane defines a circle 80 of radius R and the machine quill is scanned around a circle 82 of radius $S_1$ to provide said stylus deflection $d_1$. It can thus be shown that:

$$R^2 = M_1^2 + K_1^2 + 2M_1 Proj_1 \qquad (2)$$

where $M_1$ is the length of the machine vector, $K_1$ is the length of the probe vector in machine co-ordinates and $Proj_1$ is the mathematical projection of the probe vector in machine co-ordinates onto the surface normal vector N.

Figure 4B:
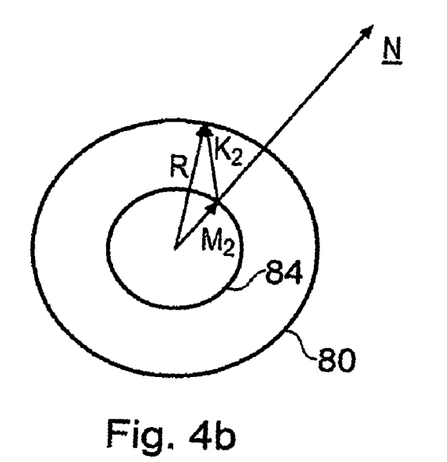

A similar equation can also be established for the second scan geometry of FIG. 4b in which the machine quill is scanned around a circle 84 of radius $S_2$ to provide the stylus deflection $d_2$. It thus follows that:

$$R^2 = M_2^2 + K_2^2 + 2M_2 Proj_2 \qquad (3)$$

where $M_2$ is the length of the machine vector, $K_2$ is the length of the probe vector in machine co-ordinates and $Proj_2$ is the mathematical projection of the probe vector in machine co-ordinates onto the (same) surface normal vector N.

Combining equations (2) and (3) yields the expression:

$$M_1 - M_2 = \frac{K_2^2 - K_1^2 + 2(M_2 Proj_2 - M_1 Proj_1)}{(M_1 + M_2)} \qquad (4)$$

As noted above, $K_1$ and $K_2$ are distances defined in the machine co-ordinate (X,Y,Z) geometry. The values of $K_1$ and $K_2$ can be given by the vector lengths of $Q_1$ and $Q_2$ respectively (i.e. $K_1 = \|Q_1\|$ and $K_2 = \|Q_2\|$) where the vectors $Q_1$ and $Q_2$ are related to measurements acquired in the probe (a,b,c) geometry via the expressions:

$$Q_1 = \Delta_p (P_1 - P_0) \qquad (5a)$$

$$Q_2 = \Delta_p (P_2 - P_0) \qquad (5b)$$

where $P_1$ and $P_2$ are measurement points (a,b,c) in the probe co-ordinate system for the first and second stylus deflections respectively, $P_0$ is the undeflected probe position (again defined in the probe co-ordinate system) and $\Delta_p$ is the pure probe calibration matrix that allows conversion from the probe geometry to machine geometry. The pure probe calibration matrix may be linear or non-linear as required. If the pure probe calibration matrix is non-linear, it should be noted that $P_1$ and $P_2$ may also comprise higher order functions of the probe deflection (a,b,c).

The machine length values $M_1$ and $M_2$ may also both include a sphere centre value ($x_0$, $y_0$, $z_0$) and are given by:

$$M_1 = +\sqrt{(x_1-x_0)^2+(y_1-y_0)^2+(z_1-z_0)^2} \qquad (6a)$$

$$M_2 = +\sqrt{(x_2-x_0)^2+(y_2-y_0)^2+(z_2-z_0)^2} \qquad (6b)$$

where the machine position data for the first and second scans is ($x_1,y_1,z_1$) and ($x_2,y_2,z_2$) respectively.

Incorporating equations (5) and (6) into equation (4) gives an expression in which $M_1 - M_2$ is related to probe data (a,b,c) taken at the first and second deflections (i.e. deflections $P_1$ and $P_2$) and the corresponding machine data (x,y,z) at the first and second deflections. Furthermore, the expression also includes the probe calibration matrix ($\Delta_p$) and the sphere centre position ($x_0,y_0,z_0$) as variables. Tip radius may also be included as a variable if required.

The nominal value of $M_1 - M_2$ is the difference in machine position for the measurements taken at stylus deflections $d_1$ and $d_2$ and can thus be assumed as known. Taking the example given above, suitable probe deflections ($d_1$ and $d_2$) for the first and second scans may be 50 μm and 500 μm. This is achieved by scanning the machine around two circular tool paths having a known difference in radius of 450 μm. The value of $M_1 - M_2$ can thus be assumed to be 450 μm.

As mentioned above, probe and machine data are acquired at multiple points on the sphere surface at the two deflection $d_1$ and $d_2$. Each scan thus yield multiple (e.g. n) pairs of machine position (x,y,z) and probe (a,b,c) measurement data.

In an ideal scenario, each of the n pairs of data taken during the $d_1$ scan would relate to the same angular position (and hence the same surface normal vector N) as the n pairs of data taken during the $d_2$ scan. However, in reality, the surface normal vectors N of the data pairs taken in the first scan (i.e. at deflection $d_1$) are unlikely to correspond exactly to the surface normal vectors N of the second scan (i.e. at stylus deflection $d_2$). An interpolation process (e.g. a linear interpolation) may thus be performed on one of the data sets to provide data sets for deflections $d_1$ and $d_2$ that include a series of machine position data values corresponding to the same surface normal vectors.

Following the above, an overall difference error for the n acquired data sets can be expressed as:

$$Error^2 = \sum_{i=1}^{i=n} (Act_i - Nom)^2 \qquad (7)$$

where "$Act_i$" is the actual value of $M_1-M_2$ found using the right hand side of equation (4) for the $i^{th}$ set of data and "Nom" is the nominal or known value of $M_1-M_2$ (e.g. 450 µm). Equation (7) thus allows a numerical, least sum of squares, error minimisation process to be performed to find the above mentioned variables. In particular, such a minimisation process yields a probe calibration matrix ($\Delta_p$) that is free of any machine errors. The minimisation process can also be used to find the sphere centre position ($x_0, y_0, z_0$), although it is possible to include this as a constant in the optimisation process if it has been measured previously to a sufficiently high accuracy. Tip radius may also be included as a variable in the error minimisation process if required.

Once the probe calibration matrix has been found, the equation for converting probe coordinates (a,b,c) into machine coordinates (x,y,z) is thus given by:

$$\begin{bmatrix} x \\ y \\ z \end{bmatrix} = \Delta_p \begin{bmatrix} a - a_0 \\ b - b_0 \\ c - c_0 \end{bmatrix} \qquad (8)$$

where a, b and c probe readings for the A, B and C probe axes respectively; $a_0$, $b_0$ and $c_0$ are the undeflected probe readings (the resting readings); and the linear calibration matrix is:

$$\Delta_p = \begin{bmatrix} a_{11} & a_{12} & a_{13} \\ a_{21} & a_{22} & a_{23} \\ a_{31} & a_{32} & a_{33} \end{bmatrix} \qquad (9)$$

Thus, for example:

$$x = a_{11}[a-a_0] + a_{12}[b-b_0] + a_{13}[c-c_0] \qquad (10)$$

For a two dimensional system, the probe calibration matrix is simply reduced to a two by two matrix. A non-linear pure probe calibration matrix (e.g. a three-by-five or a three-by-seven matrix) may also be calculated, if required, in which higher order terms are also included. In such an example, it would be recognised that the probe data would also include higher order terms.

The advantage of the above technique lies in the fact that, unlike prior art methods, a pure calibration matrix is provided that does not include any machine errors. Once the pure probe calibration matrix has been found, a further step can be performed to find machine errors in a certain region or regions of the machine. In particular, once the pure probe matrix $\Delta_p$ has been found it is possible to find machine geometry errors using the calibrated probe.

At this point it should be noted that the most common technique for establishing machine geometry errors is the so-called ball bar test. A ball bar test is a calibration process that determines the sphericity of probe movement. One example of a ball bar test is described in EP0508686 in which a machine spindle is attached to a pivot joint fixed on the machine bed by an extendable bar (the ball bar). In this example, the ball bar has internal transducers that measure the length of the ball bar as the spindle is instructed to traverse a circle centred on the pivot joint.

Figure 5:
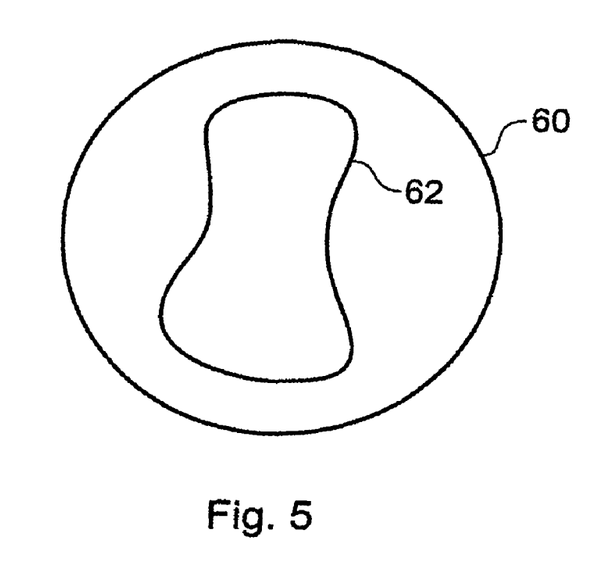
FIG. 5 is a schematic view of a ball bar plot.

The result of the prior art ball bar techniques is a so-called ball bar plot. An example of such a ball bar plot is shown in FIG. 5. In particular, FIG. 5 shows how a machine can be instructed to describe a circle of certain radius (e.g. the true circle 60). Any deviations from the true circle 60 are recorded by the ball bar and can be plotted 62 to show the accuracy of the machine. It is then known to apply geometrical corrections to compensate for the machine geometry errors; i.e. so that the machine traverses a true circle as instructed.

The method of the present invention allows a ball bar plot to be established without the need for an actual ball bar. Consider a set of probe and machine data that is acquired along a contour around the equator of the calibration sphere (e.g. in the x-y plane). The machine and probe data may be the data that was acquired when calculating the pure probe matrix as described above, or it may be acquired separately. The probe tip (a,b) readings can be multiplied by the pure probe matrix $\Delta_p$ and added to the machine (x,y) readings. In other words, ball bar data can be given by:

$$\text{Ball bar data} = \Delta_p P + M \qquad (11)$$

where P is the probe data and M is the machine data. The ball bar data calculated using equation (11) thus provides a ball bar plot of the type shown in FIG. 5. This technique is advantageous because information regarding the path of probe movement (i.e. the tool path) is obtained without the need to carry out a separate calibration process using a ball bar.

After ball bar data has been calculated, a compensation can be found in a known manner and applied to tip position data to mitigate these geometric errors. In other words, a compensation matrix can be found to turn the data plotted as 62 in FIG. 5 into the true circle 60. The tip position can thus be expressed as:

$$\text{Tip position} = \Delta_p P + \Delta_m M \qquad (12)$$

where $\Delta_m$ is the compensation that, when applied to machine data (M), removes the geometric errors. It should be noted that one cause of the machine geometry errors that are corrected by the compensation $\Delta_m$ arises from backlash of the servo motors which control the x and y movement of the machine.

It should also be remembered that the method of the present invention provides a pure probe calibration matrix $\Delta_p$ that is independent of the machine errors associated with the location within the machine working envelope in which measurements were taken to derive said pure probe calibration matrix. Excluding machine errors from the probe calibration matrix also facilitates variable speed scanning. In other words, the present invention also allows any dynamic errors of the system to be calculated and measurement data compensated accordingly.

In order to determine dynamic errors, two calibration scans are carried out at a chosen deflection (e.g. $d_1$) but different speeds; for example, the two extremes of speed which will be used at may be 250 mm/s and 330 mm/s. Assuming all other conditions have negligible difference, the dynamic error is given by the difference between the readings obtained by the two different speed scans. This allows a dynamic error compensation matrix $\Delta_a$ to be calculated which compensates tip position data for dynamic errors.

For scanning speeds which lie in-between the two chosen scan speeds, the dynamic error compensation can be interpolated radially. If necessary, additional calibration scans can be conducted to increase the accuracy of the interpolation. Advantageously, the chosen deflection is either $d_1$ or $d_2$ as this can reduce the number of calibration scans required. Once the dynamic error compensation has been calculated, variable speed scanning can be enabled thereby providing faster measurement of parts without loss of data or resolution.

The dynamic error compensation due to velocity change $(\Delta_a)$ can be applied to acquired data in a number of ways. One way is to firstly calculate a machine error compensation matrix $(\Delta_m)$ in the manner described above using the ball bar data to compensate for the local and global machine errors in the region of the machine envelope in which the multiple velocity scans are to be conducted. A further scan can then be conducted at a different speed at one of the deflections used previously. A dynamic error compensation matrix $(\Delta_a)$ can then be found from the difference between the two scans performed at different speeds at the same deflection. This allows tip position to be given by:

$$\text{Tip position} = \Delta_p P + \Delta_a \Delta_m M \quad (13)$$

It should be noted that although the matrices $(\Delta)$ described herein may take the form of geometrical matrices as outlined in the above examples, the matrix may actually be implemented in any suitable form. For example, each matrix may comprise one or more look up tables or similar. In the case of the dynamic compensation matrix, a plurality of dynamic error compensation matrices $\Delta_a$ may be provided in the form of look-up tables (LUTs) that are used when scanning at speeds contained within certain predefined ranges.

It is also possible to provide a combined geometric/dynamic compensation matrix $(\Delta_{a\alpha m})$ that is calculated by subtracting the ball bar data obtained from two scans carried out at the same deflection but different speeds. The resultant ball bar data can then be used to calculate a combined compensation $(\Delta_{a+m})$ for dynamic and machine errors, as follows:

$$\text{Tip position} = \Delta_p P + \Delta_{a+m} M \quad (14)$$

For both these techniques, the geometric and dynamic error compensation can typically only be considered accurate for the location in which the scans have been conducted. If other locations within the working envelope of the machine will be used for measurement scans, the calibration process can be repeated for said other locations or a number of them carried out to enable interpolation of error compensation between the locations.

If, during a calibration process to produce a calibration compensation matrix both clockwise and anti-clockwise scans are conducted, a combined calibration matrix can be produced which would average the dynamic errors or a calibration matrix can be produced for each direction.

The calibration artefact is preferably a sphere as this gives the least complicated results, however any other shape could be used; for example, a curved shape such as an ovoid could be used. In such a case, the ball bar plot would vary from an ovoid rather than a sphere. It is also possible to use an artefact with facets but, as constant acceleration is difficult to maintain when using higher speeds, this can add complication to the calculations.

It should be noted that the speeds, probe deflections etc described herein represent typical speeds that could be used and are given purely as examples to aid understanding of the invention. Other speeds, probe deflections, scan paths etc could be used as required in accordance with the invention. For example, if a fine featured article was to be measured following the calibration, then the speeds used would be much slower such as 35 mm/s instead of 250 mm/s. Thus the speeds used in the examples are merely examples and in certain circumstances could be higher or lower than those given.

The invention claimed is:

1. A method of calibrating a measurement probe mounted on a machine, the measurement probe having a stylus with a workpiece contacting tip, wherein the method comprises determining a probe calibration matrix that relates the probe outputs to the machine coordinate system, the method comprising the steps of:
   (i) scanning a calibration artefact using a first probe deflection to obtain first machine data;
   (ii) scanning the calibration artefact using a second probe deflection to obtain second machine data; and
   (iii) using the first machine data and the second machine data to obtain a pure probe calibration matrix in which any machine errors are substantially omitted,
   wherein a machine position difference value relating to a difference between the first machine data and the second machine data is assumed to be known,
   and step (iii) further includes using a numerical process to determine the pure probe calibration matrix using the known machine position difference value.

2. A method according to claim 1 in which the probe outputs comprise probe output data defined in a probe coordinate system, wherein step (i) further comprises obtaining first probe output data corresponding to said first machine data, step (ii) further comprises obtaining second probe output data corresponding to said second machine data, and step (iii) comprises using the first machine data, the second machine data, the first probe output data and the second probe output data to obtain the pure probe calibration matrix.

3. A method according to claim 1, wherein step (iii) comprises minimising the error between calculated machine position difference values and said known machine position difference value.

4. A method according claim 1 in which the first machine data comprises a series of first machine data values and the second machine data comprises a series of second machine data values, wherein the first machine data values and the second machine data values relate to machine positions having corresponding surface normal vectors.

5. A method according to claim 1 wherein the pure probe calibration matrix comprises at least one look-up table.

6. A method according to claim 1 comprising the steps of:
   (iv) taking machine data and corresponding measurement probe outputs that are acquired from the calibration artefact when located at a first position within the machine envelope; and
   (v) using the pure probe calibration matrix determined in step (iii) to provide ball bar data that allows the instructed machine movement to be compared to actual machine movement.

7. A method according to claim 6 wherein step (v) comprises calculating a machine geometry calibration matrix for said first position within the machine envelope.

8. A method according to claim 1 comprising the step of scanning the calibration artefact at two or more different speeds.

9. A method according to claim 8 wherein step (i) is performed at a first scan speed and then repeated at a second scan speed.

10. A method according to claim 8 wherein a dynamic calibration matrix is determined from the machine data and probe outputs of the scans performed at the different speeds.

11. A method according to claim 1 wherein the scanning axes of the measurement probe are mutually orthogonal and are nominally parallel to the mutually orthogonal axes of the machine coordinate system.

12. A method according to claim 1 wherein steps (i) and (ii) comprise scanning the stylus tip of the measurement probe along substantially the same path across the surface of the calibration artefact.

13. A method according to claim 1 wherein steps (i) and (ii) each comprise scanning the surface of the calibration artefact in one or more planes.

14. A method according to claim 1 wherein said calibration artefact comprises a sphere.

15. Measurement apparatus comprising a measurement probe, a machine and a calibration artefact, wherein the measurement probe has a stylus with a workpiece contacting tip, the measurement probe is mounted on said machine and said machine comprises a controller for controlling movement of the measurement probe, wherein the controller is arranged to perform a calibration routine to determine a probe calibration matrix that relates the probe outputs to the machine coordinate system, the controller being arranged to:
  (i) cause the measurement probe to scan a calibration artefact using a first probe deflection thereby obtaining first machine data;
  (ii) cause the measurement probe to scan a calibration artefact using a second probe deflection thereby obtaining second machine data; and
  (iii) use the first machine data and the second machine data to obtain a pure probe calibration matrix in which any machine errors are substantially omitted,
wherein a machine position difference value relating to a difference between the first machine data and the second machine data is assumed to be known, and
the controller uses a numerical process to determine the pure probe calibration matrix using the known machine position difference value.

* * * * *